United States Patent
Takenaka et al.

[11] Patent Number: 5,806,369
[45] Date of Patent: Sep. 15, 1998

[54] LINEAR MOTION APPARATUS

[75] Inventors: Hiroyuki Takenaka; Kiyoshi Ando, both of Gifu, Japan

[73] Assignee: Teijin Seiki Co., Ltd., Osaka, Japan

[21] Appl. No.: 730,690

[22] Filed: Oct. 11, 1996

[30] Foreign Application Priority Data

Oct. 12, 1995 [JP] Japan .................................. 7-263777

[51] Int. Cl.$^6$ ................................................ F16H 27/00
[52] U.S. Cl. ................................................ 74/116
[58] Field of Search ................................................ 74/116

[56] References Cited

U.S. PATENT DOCUMENTS

| | | | |
|---|---|---|---|
| 5,187,994 | 2/1993 | Hirai et al. | 74/120 |
| 5,582,068 | 12/1996 | Fukui | 74/116 |

FOREIGN PATENT DOCUMENTS

| | | | |
|---|---|---|---|
| A-0482828 | 4/1992 | European Pat. Off. | |
| A-195 12 780 | 10/1995 | Germany. | |
| 4-321857 | 11/1992 | Japan | 74/116 |

*Primary Examiner*—Allan D. Herrmann
*Attorney, Agent, or Firm*—Panitch Schwarze Jacobs & Nadel, P.C.

[57] ABSTRACT

A linear motion apparatus is comprised of: a toothed rail (40); a linearly driving mechanism section (50) having a plurality of swinging plates (53), crankshafts (54, 55), and a casing (51); and guiding means for guiding the casing (51) relatively movably with respect to the toothed rail (40). The casing (51) includes: a pair of side portions (61, 62) which are guided by the guiding means on both sides, in a tooth width direction, of the rail (40); a pair of end plate portions (63, 64) which are located on opposite sides, as viewed in a longitudinal direction of the rail (40), of the swinging plates (53) and connect opposite end portions of the pair of side plate portions (61, 62); and a coupling member (521) which is located between the plurality of crankshafts (54, 55) as viewed in the longitudinal direction of the rail and couple intermediate portions of the pair of side plate portions (61, 62). The coupling member (521) is preferably passed through the swinging plates (53). The linear motion apparatus is compact and low-cost, and capable of maintaining a stable state of meshing between swinging plates and a toothed rail even if a compact casing is adopted.

4 Claims, 6 Drawing Sheets

PRIOR ART

FIG. 8 (a)

PRIOR ART

FIG. 8 (b)

PRIOR ART

FIG. 8 (c)

LINEAR MOTION APPARATUS

BACKGROUND OF THE INVENTION

The present invention relates to a linear motion apparatus which linearly moves by converting an input of rotary motion into linear motion, and more particularly to a linear motion apparatus which utilizes swinging plates and a toothed rail which forms a substantially rectilinear track.

In feeding mechanisms of machine tools and various conveying apparatuses, linear motion apparatuses for converting rotary motion into linear motion are used extensively. Among these linear motion apparatuses, there is a type in which the apparatus linearly moves in the direction of an input shaft of rotation and another type in which the apparatus linearly moves in a direction perpendicular to the input shaft of rotation. In either type, a compact and lightweight apparatus of simple construction is used to respond to the requirement for the compact size of the overall machine. In addition, among the linear motion apparatuses, one which linearly moves in the direction of the input shaft of rotation by means of a ball screw is known as having high feeding accuracy in linear advancement and being capable of withstanding a high load. However, since the rotatable screw shaft must be made long and processed with high accuracy, and its opposite ends must be supported and the apparatus must be rotatively driven at one end thereof, it is difficult to apply such an apparatus to reciprocating motion with a stroke of more than a certain length.

According, in recent years, there has been proposed an apparatus which is capable of moving substantially rectilinearly while maintaining high feeding accuracy and withstanding a substantially long, large load (or on a gradually curved endless track) by making use of swinging-type active racks and a toothed rail which forms a substantially rectilinear track (including one which is slightly curved).

Figure 6:
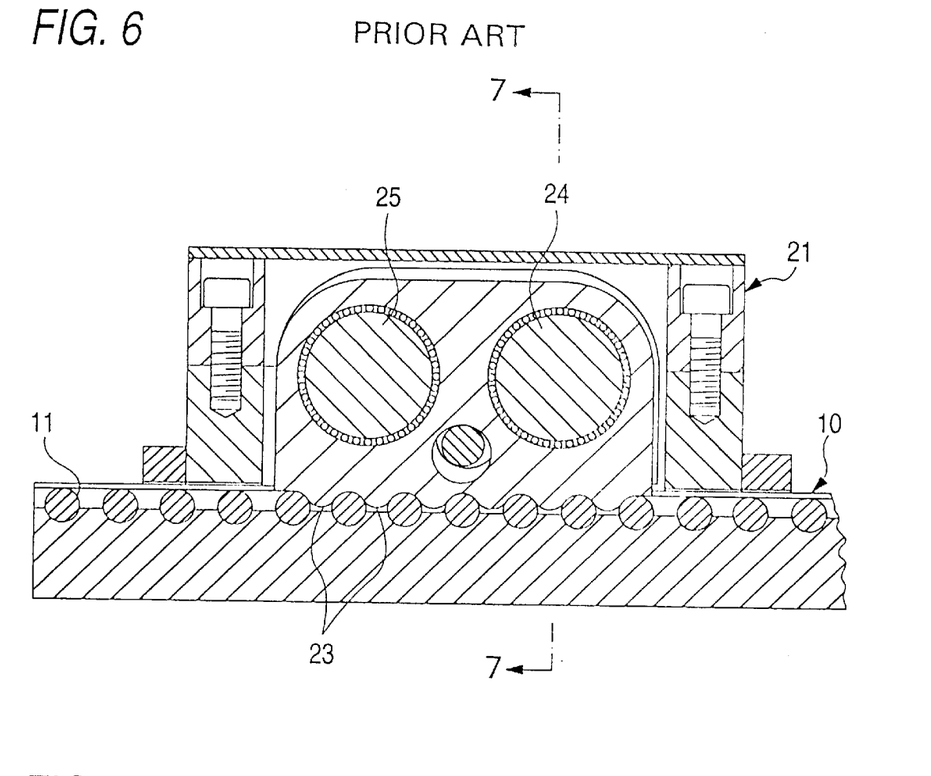
FIG. 6 is a front cross-sectional view of a conventional linear motion apparatus.
Figure 7:
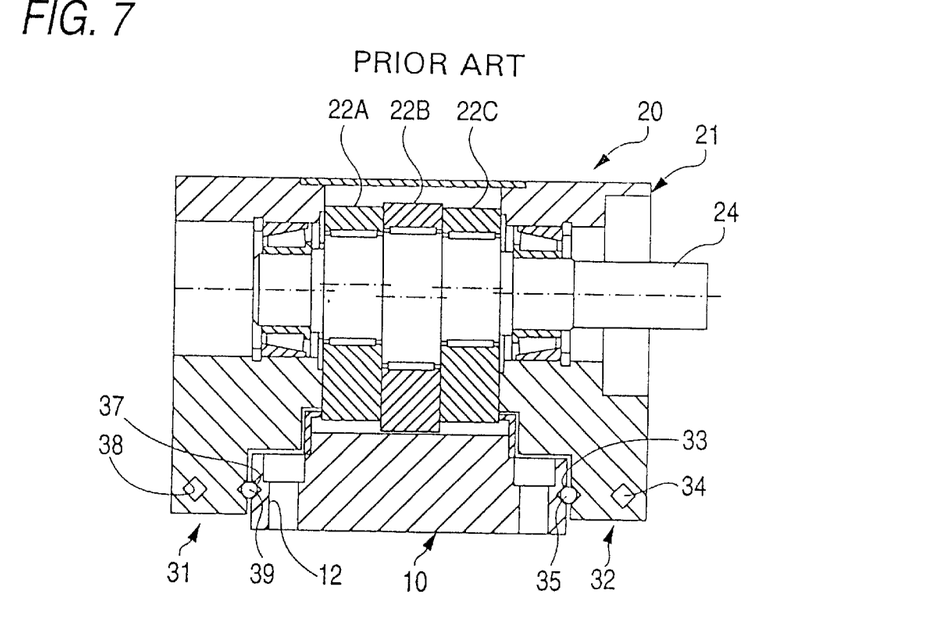
FIG. 7 is a cross-sectional view taken along line 7—7 of FIG. 6.

FIGS. 6 and 7 show apparatuses on which improvements have been made with respect to the assembling efficiency and motion characteristics among linear motion apparatus of this type. FIG. 6 is a front cross-sectional view thereof, and FIG. 7 is a cross-sectional view taken along line $B_2$—$B_2$ of FIG. 6.

As shown in these drawings, this linear motion apparatus is provided with a toothed rail 10 serving as both a passive rack and a guide rail and a linearly driving mechanism section 20 which undergoes linear motion relative to the same. The toothed rail 10 has a plurality of teeth 11 and a plurality of bolt holes 12 for fixing the rail 10 to an unillustrated supporting member. The linearly driving mechanism section 20 has a casing 21 and a plurality of swinging plates 22A, 22B, and 22C accommodated in the casing 21 and meshing with the teeth 11 of the toothed rail 10, and teeth 23 of the swinging plates 22A to 22C have a tooth profile of an identical pitch to that of the teeth 11 of the toothed rail 10. These swinging plates 22A to 22C are supported in the casing 21 through crankshafts 24 and 25, one crankshaft 24 serves as an input shaft which is driven by an unillustrated drive motor. The arrangement provided is such that when the crankshaft 24 is rotated by an input, the swinging plates 22A to 22C supported by the crankshafts 24 and 25 mesh with the teeth 11 of the toothed rail 10 while undergoing circular motion (hereafter, this state of motion will be simply referred to as swinging motion) in parallel to each other while maintaining a predetermined phase difference within the casing 21, thereby causing the casing 21 and the toothed rail 10 to undergo relative movement in the longitudinal direction of the toothed rail 10.

Reference numerals 31 and 32 denote casing guiding means for guiding the casing 21 relatively movably with respect to the toothed rail 10 on both sides, in a tooth width direction, of the toothed rail 10. These casing guiding means 31 and 32 are adapted to guide the casing 21 only in the longitudinal direction (axial direction) of the toothed rail 10. The guiding means 31 has a guide groove portion 33 formed on one side surface of the toothed rail 10, a ball circulating portion 34 provided in one side plate portion of the casing 21, and a plurality of circulating-type balls 35 fitted in the guide groove portion 33 and the ball circulating portion 34. Meanwhile, the guiding means 32 similarly has a guide groove portion 37 formed on the other side surface of the toothed rail 10, a ball circulating portion 38 provided in the other side plate portion of the casing 21, and a plurality of circulating-type balls 39 fitted in the guide groove portion 37 and the ball circulating portion 38.

In the above-described arrangement, when the crankshaft 24 is driven by the unillustrated motor, the swinging plates 22A to 22C supported by the crankshafts 24 and 25 are swung while maintaining the predetermined phase difference.

At this time, one of the swinging plates 22A to 22C, e.g., the swinging plate 22A, moves to a spaced-apart position which is spaced apart most from a central axis of the toothed rail 10 while maintaining a phase difference with the other swinging plates 22B and 22C to a fixed level within a certain range of swinging motion (e.g., in a range from 0 degree to 180 degrees) and causes its teeth 23 to abut against apices of the teeth 11, then approaches the central axis of the toothed rail 10 while pushing one inclined surfaces of the teeth 11, further approaches the central axis of the toothed rail 10, and reaches the troughs at the dedenda of the teeth 11. As for this operation, the same holds true of the other swinging plates 22B and 22C, and since the swinging plates 22A to 22C are swung while maintaining the predetermined phase difference, one of the swinging plates 22A to 22C constantly presses the teeth 11 by means of the teeth 23.

Meanwhile, in the above-described state, since the toothed rail 10 and the casing 21 are guided in such a manner as to undergo relative movement only in the longitudinal direction of the toothed rail 10 by means of the guiding means 31 and 32, one of the casing 21 and the toothed rail 10 (the movable side) moves only in a predetermined linear direction. That is, since the swinging plates 22A to 22C alternately approach the central axis of the toothed rail 10 while pushing one inclined surfaces of the teeth 11, a thrust acts in the longitudinal direction of the toothed rail 10. Then, the casing 21 undergoes relative movement in the longitudinal direction of the toothed rail 10 only by one pitch of the teeth 11 per revolution of the crankshafts 24 and 25, so that a moving portion on which the casing 21 is attached slowly moves at a predetermined speed.

However, with the above-described linear motion apparatus, problems which are described below have been encountered since, when a thrust is produced in conjunction with the swinging motion of the swinging plates 22A to 22C, contact pressure acts on the respective meshing surfaces of the plurality of teeth 23 of the swinging plates 22A to 22C and the plurality of teeth 11 of the toothed rail 10, and a relatively large force consequently acts in a direction in which the swinging plates 22A to 22C and the casing 21 move away from the toothed rail 10.

Figure 8:
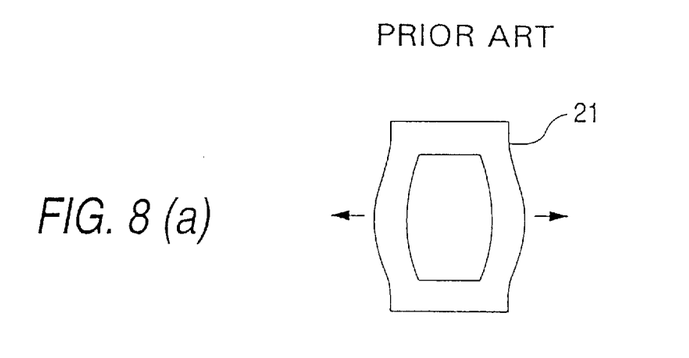

As shown in FIGS. 8(a) to 8(c), when a reactive force from the toothed rail 10 acting on the swinging plates 22A to 22C is applied to the casing 21 through the crankshafts 24 and 25, the casing 21 is subjected to a large force in a direction in which the casing 21 moves away from the toothed rail 10 particularly in the vicinities of its portions for supporting the crankshafts 24 and 25, i.e., in a $D_1$ direction in which the balls 35 and 39 are dislocated from the guide groove portions 33 and 37. Hence, as shown in FIG. 8(a), the casing 21 becomes expanded in the vicinities of its portions for supporting the crankshafts 24 and 25 in correspondence with the magnitude of the aforementioned reactive force. At the same time, as shown in FIGS. 8(b) and 8(c), the casing guiding portions 31 and 32 which are constructed in a downwardly-oriented cantilevered manner become pushed and expanded in the left-and-right direction in the drawings in correspondence with the magnitude of the aforementioned reactive force.

In addition, since the swinging plates 22A to 22C alternately produce a thrust and are subjected to a largest reactive force, as shown in FIG. 8(c), moment about the central axis of the toothed rail 10 acts on the casing 21 alternately in one direction $D_2$ and in the opposite direction, and its magnitude also changes. Accordingly, the force acting in the direction in which the balls 35 and 39 are dislocated from the guide groove portions 33 and 37 also changes substantially.

For such a reason, particularly in a case where the casing 21 having the casing guiding portions 31 and 32 of the cantilevered construction is compact, the meshing state of the swinging plates 22A to 22C and the toothed rail 10 becomes unstable, and the accuracy with which the casing 21 is fed also becomes unstable. Consequently, it is difficult to maintain a high degree of feeding accuracy. Hence, it is impossible to sufficiently respond to the requirements in recent years for the compact size and lower cost.

SUMMARY OF THE INVENTION

Accordingly, an object of the present invention is to provide a linear motion apparatus which is capable of maintaining a stable state of meshing between the swinging plates and the toothed rail even if a compact casing is adopted.

To attain the above object, in accordance with the present invention according to claim 1, there is provided a linear motion apparatus comprising: a toothed rail having a plurality of teeth of a predetermined pitch; a linearly driving mechanism section including a plurality of swinging plates having a plurality of teeth of an identical pitch to that of the teeth of the toothed rail, a plurality of rotatable crankshafts which engage the swinging plates such that the teeth of the swinging plates swing in parallel to each other while maintaining a predetermined phase difference, and a casing for supporting the swinging plates through the crankshafts such that the swinging plates oppose the toothed rail in parallel to each other and for converting rotation of the crankshaft to relative movement of the casing and the toothed rail; and guiding means for guiding the casing on both sides, in a tooth width direction, of the toothed rail such that the casing is capable of undergoing relative movement with respect to the toothed rail, wherein the casing includes: a pair of side plate portions which extend in parallel on both sides, in the tooth width direction, of the toothed rail and are guided by the guiding means; a pair of end plate portions which are located on opposite sides, as viewed in a longitudinal direction of the toothed rail, of the swinging plates and connect opposite end portions of the pair of side plate portions; and a coupling member which is located between the plurality of crankshafts as viewed in the longitudinal direction of the toothed rail and couple intermediate portions of the pair of side plate portions. Accordingly, the pair of side plate portions which are provided on both sides, in the tooth width direction, of the toothed rail and are guided by the guiding means are coupled to each other and are reinforced at their opposite end portions and intermediate portions by means of the pair of end plate portions located on opposite sides of the swinging plates and the coupling member located between the plurality of crankshafts as viewed in the longitudinal direction of the toothed rail. In addition, if, as described in claim 2, an arrangement is provided such that each of the swinging plates has a through hole portion through which the coupling member of the casing is passed through, and the coupling member of the casing is detachably connected to the side plate portions of the casing, the coupling member can be disposed at a position effective for the reinforcement of the casing, and the operation of assembling the apparatus can be facilitated.

It should be noted that the assembling efficiency is further improved if the aforementioned casing is comprised of first and second segments which vertically oppose each other with the plurality of crankshafts placed therebetween and which are coupled to each other and constitute the side plate portions and the end plate portions, and if the aforementioned coupling member couples those portions of the toothed rail-side second segment (of the first and second segments) which constitute the lower portions of the side plate portions. In addition, the guiding means is preferably provided with guide grooves formed on both side surfaces, in the tooth width direction, of the toothed rail, as well as rolling members (e.g., balls or rollers) which are interposed between each of the side plate portions of the casing and the toothed rail and are held in the side plate portions so as to roll along the guide grooves.

BRIEF DESCRIPTION OF THE DRAWINGS

FIGS. 5(a) and 5(b) are perspective views illustrating a first and a second segment of a casing shown in FIG. 1, in which FIG. 5(a) shows the first segment, and FIGS. 5(b) shows the second segment;

FIGS. 8(a), 8(b) and 8(c) are diagrams explaining the problems of the conventional linear motion apparatus, in which FIG. 8(a) is a plan view illustrating a state in which an intermediate portion of the casing is bulged, FIG. 8(b) is a side elevational view illustrating a state in which bottom portions of a guide portion of the casing are expanded; and FIG. 8(c) shows a side elevational view illustrating the directions of a force and moment applied to the casing as well as the expanded state of the bottoms of the guide portion in an assembled state.

DETAILED DESCRIPTION OF THE PREFERRED EMBODIMENTS

Referring now to the accompanying drawings, a description will be given of a preferred embodiment of the present invention.

Figure 1:
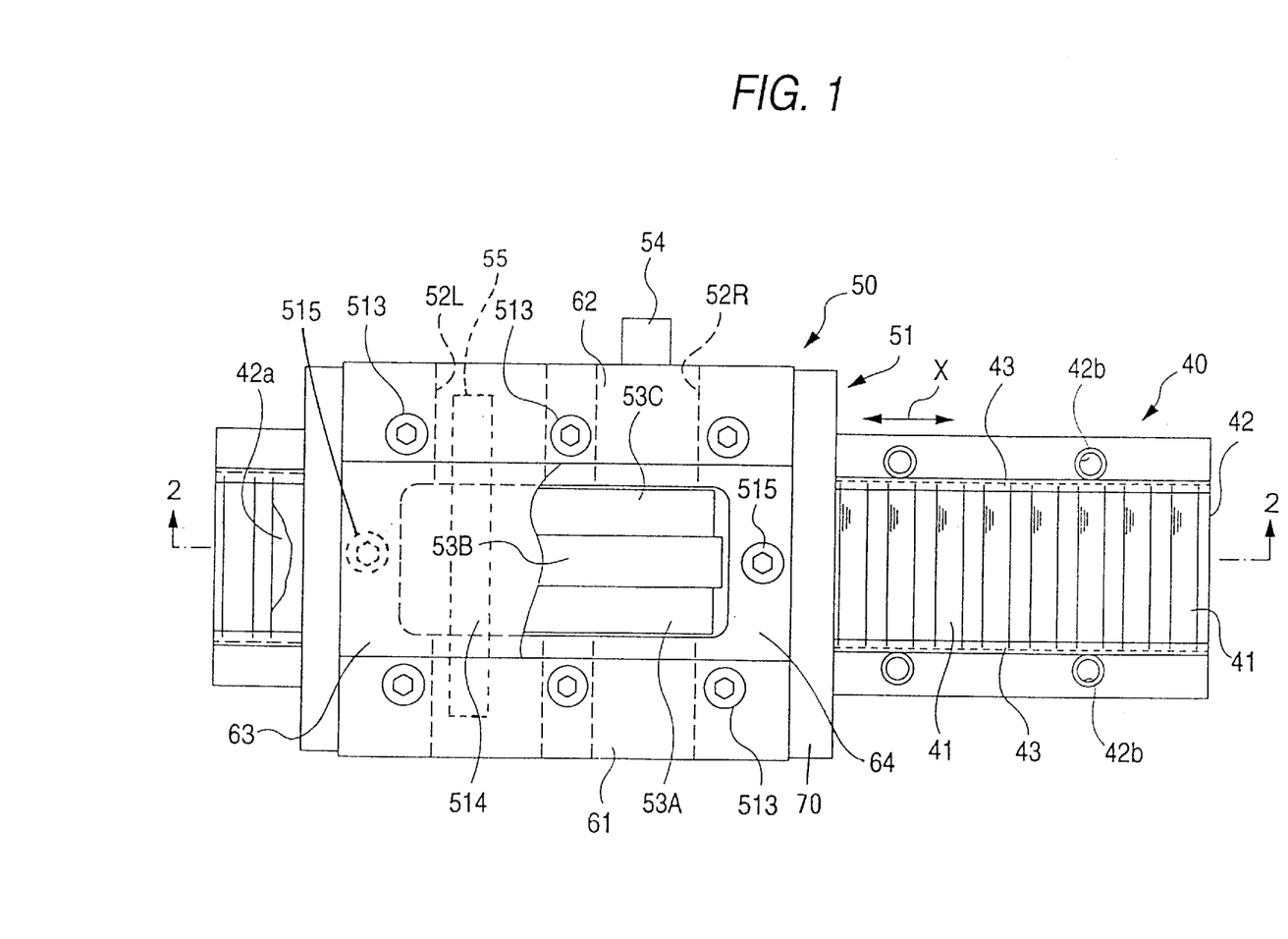
FIG. 1 is a plan view of a linear motion apparatus illustrating an example of a preferred embodiment of the present invention.
Figure 2:
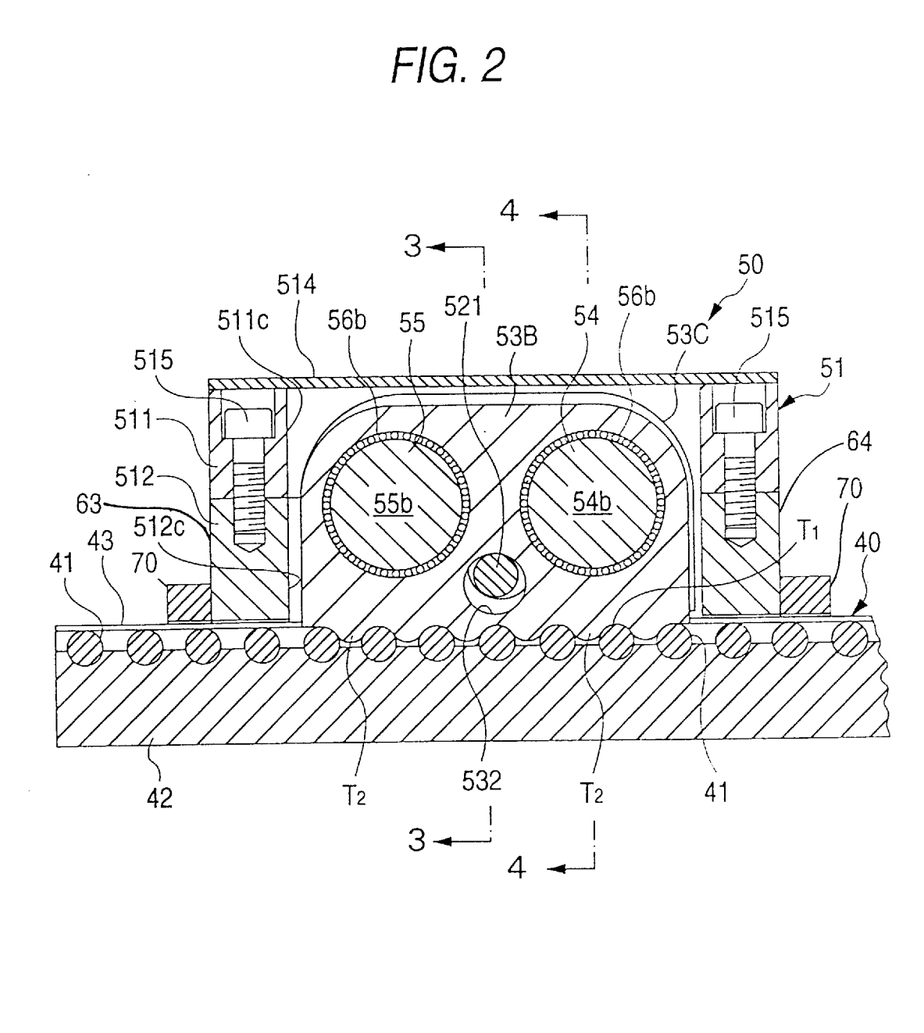
FIG. 2 is a cross-sectional view taken along line 2—2 of FIG. 1.
Figure 3:
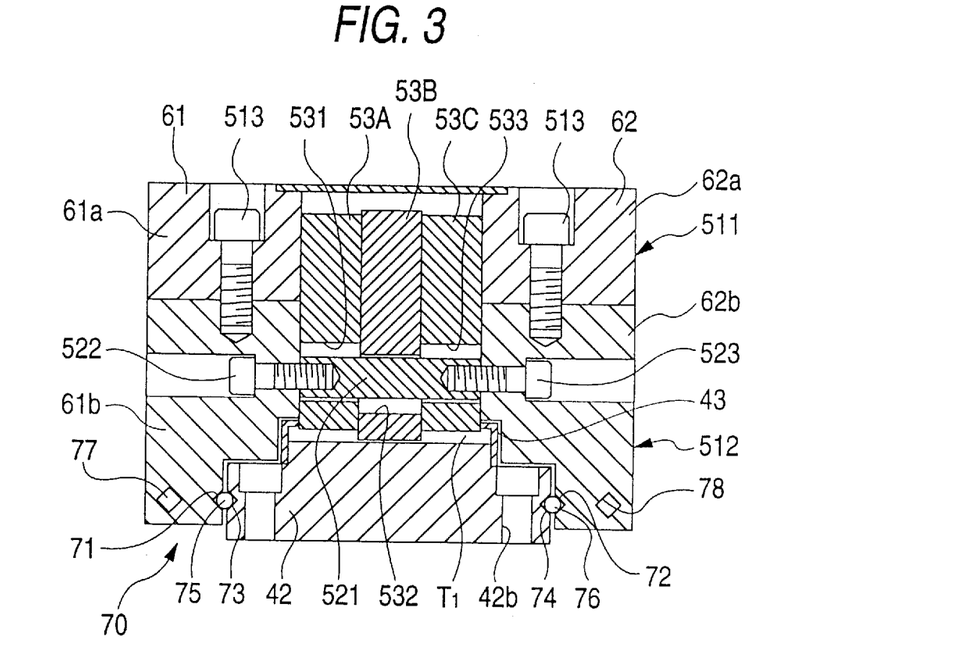
FIG. 3 is a is a cross-sectional view taken along line 3—3 of FIG. 2.
Figure 4:
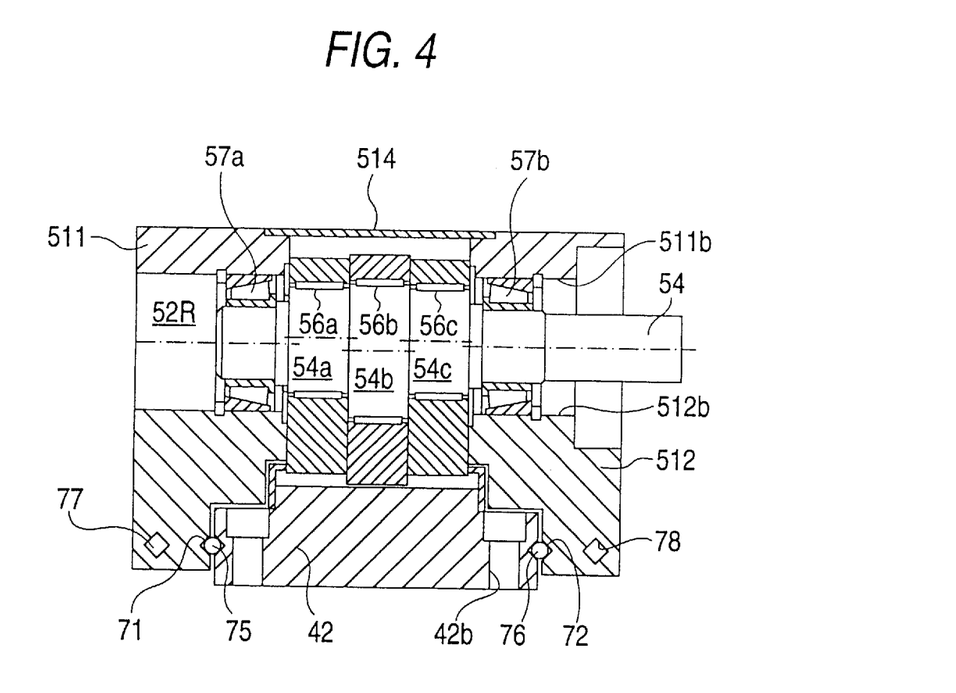
FIG. 4 is a is a cross-sectional view taken along line 4—4 of FIG. 2.

FIGS. 1 to 5 are diagrams illustrating an example of a preferred embodiment of the present invention. FIG. 1 is a plan view thereof; FIG. 2 is a cross-sectional view taken along lines 2—2 in FIG. 1; FIG. 3 is a cross-sectional view taken along line 4—4 in FIG. 2; FIG. 4 is a cross-sectional view taken along line 3—3 in FIG. 2; and FIGS. 5(a) and 5(b) are perspective views of segments constituting a casing, respectively.

As shown in FIGS. 1 to 4, this linear motion apparatus is comprised of: a toothed rail 40 having a plurality of teeth $T_1$ of a predetermined pitch and forming a linear track; a linearly driving mechanism section 50 provided along the toothed rail 40 in such a manner as to move relative to the same; and a guiding means 70 for guiding a casing 51 of the linearly driving mechanism section 50 on both sides, in the tooth width direction, of the toothed rail 40 such that the casing 51 of the linearly driving mechanism section 50 is capable of moving relative to the toothed rail 40.

The toothed rail 40 is comprised of, for instance, a plurality of cylindrical pins 41 arranged in parallel at predetermined pitches in such a manner as to form the teeth $T_1$; a rail main body 42 having a plurality of parallel semicircular grooves 42a for holding the pins 41 rotatably, about their axes and a plurality of fixing bolt holes 42b; and a pair of holding plates 43 having an L-shaped cross section and engaging opposite ends of the pins 41 so as to restrict the movement of the pins 41 other than their rotation within the semicircular grooves 42a. Incidentally, in the case of a heavy load, it is preferable to apply a lubricant to the peripheries of the pins 41, but in a case where the linear motion apparatus is used for a small lightweight load, it is possible to form lubricating coats on the outer peripheries of the pins 41 or the semicircular grooves 42a of the rail main body 42, or form the pins 41 by a material having high self-lubricity.

The linearly driving mechanism section 50 is comprised of the casing 51 having a plurality of shaft holes 52L and 52R arranged on parallel axes; a plurality of swinging plates 53A, 53B, and 53C having a plurality of teeth $T_2$ of the same pitch as that of the teeth $T_1$ of the toothed rail 40; and a plurality of rotatable crankshafts 54 and 55 which engage and support the swinging plates 53A to 53C such that the teeth $T_2$ of the swinging plates 53A to 53C swing with predetermined amounts of eccentricity in parallel to each other while maintaining a predetermined phase difference among them. The swinging plates 53A to 53C are accommodated in, for instance, the casing 51, and are supported in parallel to each other in such a manner as to cause the teeth $T_1$ to oppose the toothed rail 40 through the crankshafts 54 and 55 by means of the casing 51. The teeth $T_2$ of the swinging plates 53A to 53C have a tooth profile of, for instance, a trochoidal curve or a cycloidal curve. In addition, the swinging plates 53A to 53C are respectively supported by the crankshafts 54 and 55 through needle bearings 56a, 56b, and 56c, and the two crankshafts 54 and 55 are supported by the casing 51 through a pair of bearings 57a and 57b. Further, in order to fit the swinging plates 53A to 53C to the crankshafts 54 and 55, a large-diameter hole is formed in a swinging plate 53 disposed in the center among the swinging plates 53A to 53C, and smaller-diameter holes are respectively formed in remaining swinging plates 52 and 54. Correspondingly, a central eccentric cam portion 54b among eccentric cam portions 54a, 54b, and 54c of one crankshaft 54 is formed with a larger diameter than the remaining eccentric cam portions 54a and 54c on both sides, while a central eccentric cam portion 55b of the other crankshaft 55 is similarly formed with a larger diameter than the eccentric cam portions on both sides (not shown).

When one crankshaft 54 is rotated by the power from an external circuit, this linearly driving mechanism section 50 causes the swinging plates 53A to 53C constituting a parallel link together with the crankshafts 54 and 55 to undergo circular motion (swinging motion) in parallel with each other while maintaining a predetermined phase difference, and causes the casing 51 and the toothed rail 40 to undergo relative movement in the direction of the central axis of the toothed rail 40. That is, the linearly driving mechanism section 50 functions as a motion converting mechanism which converts the rotation inputted to the crankshaft 54 to the relative movement of the casing 51 and the toothed rail 40 in a predetermined rectilinear direction by means of the crankshafts 54 and 55 and the swinging plates 53A to 53C.

Meanwhile, the casing 51 has a pair of side plate portions 61 and 62 which extend in parallel on both sides, in the tooth width direction, of the toothed rail 40, as well as a pair of end plate portions 63 and 64 which are located on opposite sides, as viewed in the longitudinal direction of the toothed rail 40, of the swinging plates 53A to 53C and connect opposite end portions of the pair of side plate portions 61 and 62. In addition, the casing 51 is constructed such that it is split into first and second segments 511 and 512, which are a vertical pair of substantially rectangular frame members, and the segments are coupled to each other by a plurality of bolts 513, so as to allow the crankshafts 54 and 55 to be rotatably supported through the bearings 57a and 57b in a state in which the plurality of swinging plates 53A to 53C are fitted to the crankshafts 54 and 55 through the needle bearings 56a, 56b, and 56c. Namely, upper halves of the side plate portions 61 and 62 and the end plate portions 63 and 64 are formed by the first segment 511, lower halves of the side plate portions 61 and 62 and the end plate portions 63 and 64 are formed by the second segment 512.

The guiding means 70 is comprised of casing-side guide groove portions 71 and 72 which are respectively provided on inner sides of those portions of the second segment 512 of the casing 51 that constitute portions of the side plate portions 61 and 62, i.e., lower halves of the pair of side plate portions 61 and 62 of the casing 51; rail-side guide groove portions 73 and 74 which are respectively provided on both side surfaces of the toothed rail 40 in such a manner as to extend in the longitudinal direction of the toothed rail 40 while maintaining a high degree of parallelism with respect to the central axis of the toothed rail 40; a plurality of balls 75 and 76 (rolling members which may be rollers which are not spherical) which are rollably provided in passages formed by the guide groove portions 71 to 74; and circulating passage portions 77 and 78 which are respectively formed in the lower halves of the side plate portions 61 and 62 of the casing 51 and, together with the aforementioned passages, form loop-like ball circulating passages. Although groove portions respectively having a substantially V-shaped cross section are illustrated as the casing-side groove portions 71 and 72 and the rail-side guide groove portions 73 and 74, these grooves may be provided with semicircular cross sections, and the circulating passage portions 77 and 78 may be correspondingly formed as holes having circular cross sections. When the balls 75 and 76 pass between the casing-side guide groove portion 71 and the rail-side guide groove portion 73 and between the casing-side guide groove portion 72 and the rail-side guide groove portion 74, respectively, while being circulated through the circulating passage 77 and 78, respectively, the balls 75 and 76 are adapted to guide the casing 51 relatively movably in the X direction in FIG. 1, which is parallel to the central axis of the toothed rail 40, with respect to the toothed rail 40. The balls 75 and 76 circulate in the forward direction or reverse direction depending on the direction of the relative movement of the casing 51 and the toothed rail 40. This guiding means 70 guides the casing 51 and the toothed rail 40 relatively movably in a predetermined axial direction through the aforementioned balls 75 and 76, and restricts the relative movement and rotation of these two members in a direction other than the aforementioned predetermined axial direction.

Figure 5A:
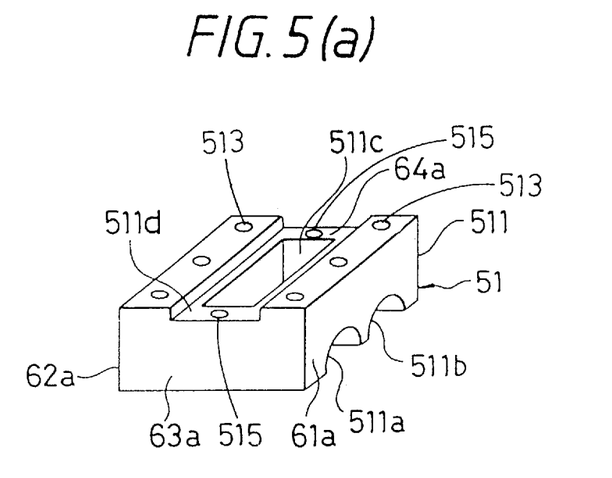
Figure 5B:
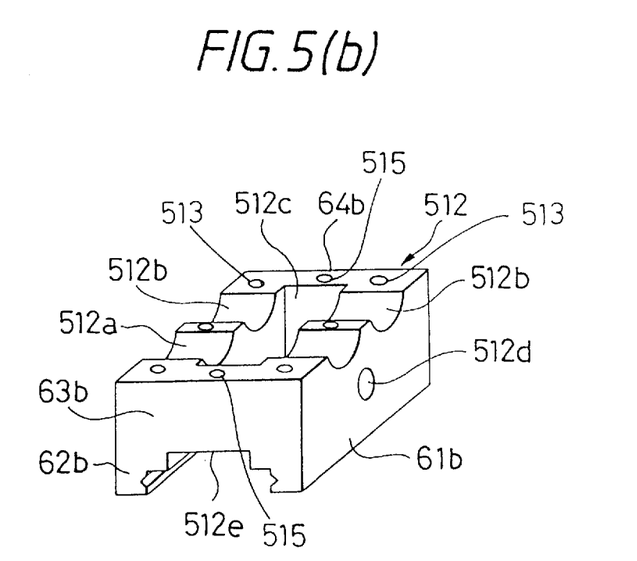

As respectively shown in FIGS. 5(a) and 5(b), in the first segment 511, portions 61a and 62a which constitute upper portions of the side plate portions 61 and 62 are each provided a pair of semicircular groove portions 511a and 511b which form peripheral wall surfaces of half circumferences of the pair of shaft holes 52L and 52R. Similarly, in the second segment 512, portions 61b and 62b which constitute lower portions of the side plate portions 61 and 62 are each provided with a pair of semicircular groove portions 512a and 512b which form peripheral wall surfaces of the remaining half circumferences of the pair of shaft holes 52L and 52R. Additionally, accommodating hole portions 511c and 512c with rectangular cross sections for accommodating the swinging plates 53A to 53C are respectively formed in central portions of the first and second segments 511 and 512. A recessed portion 511d is formed in an upper portion of the first segment 511 in such a manner as to close the accommodating hole 511c of the first segment 511, and a cover 514 is fitted therein. Further, in the second segment, a pair of coaxial round holes 512d are respectively formed in the portions 61b and 62b which form the lower portions of the pair of side plate portions 61 and 62. Meanwhile, recessed portions 512e opposing the tooth face portions of the toothed rail 40 are respectively formed in portions 63b and 64b which constitute lower halves of the pair of end plate portions 63 and 64 of the second segment 512.

In addition, the casing 51 of this embodiment is further provided with a coupling member 521, which is located between the plurality of crankshafts 54 and 55 as viewed in the longitudinal direction of the toothed rail 40 and couple intermediate portions of the pair of side plate portions 61 and 62. As shown in FIG. 2, at a position equidistanced from the crankshafts 54 and 55, the coupling member 521 of the casing 51 is passed through through-hole portions 531, 532, and 533 formed at predetermined positions in the swinging plates 53A to 53C, and is detachably connected to the portions 61b and 62b constituting the lower portions of the side plate portions 61 and 62 of the second segment 512 at its opposite end portions to which a plurality of bolts are screwed, as shown in FIG. 3. In addition, the diameters and positions of the respective through hole portions 531, 532, and 533 in the swinging plates 53A to 53C are set such that the swinging plates 53A to 53C and the coupling member 521 do not abut against each other and are spaced apart a predetermined distance in a state in which the swinging plates 53A to 53C are supported by the crankshafts 54 and 55.

In assembling, the coupling member 521 is inserted in advance in the through hole portions 531, 532, and 533 in the swinging plates 53A to 53C with the crankshafts 54 and 55 fitted thereto, and the bolts 522 and 523 which are respectively inserted in the pair of round holes 512d are screwed into its opposite end portions so as to couple the intermediate portions of the side plate portions 61 and 62.

In operation, when the crankshaft 54 is driven by an unillustrated drive motor, the swinging plates 53A to 53C supported by the crankshafts 54 and 55 swing while maintaining a predetermined phase difference, and at the same time consecutively press the inclined surfaces of their teeth $T_2$ against the teeth $T_1$ of the toothed rail 40. Consequently, a thrust acts in the longitudinal direction of the toothed rail 40.

When a thrust is thus produced in conjunction with the swinging motion of the swinging plates 53A to 53C, contact pressure acts on a plurality of contact portions of the teeth $T_2$ of the swinging plates 53A to 53C and the teeth $T_1$ of the toothed rail 40, respectively. Consequently, a relatively large reactive force is applied to the swinging plates 53A to 53C in a direction in which the crankshafts 54 and 55 together with the casing 51 are moved away from the toothed rail 40.

However, since the side plate portions 61 and 62 of the casing 51 are coupled to each other at their opposite ends by means of the end plate portions 63 and 64, and since the side plate portions 61 and 62 at substantially intermediate positions of their portions for supporting the crankshafts 54 and 55 are coupled to each other and are reinforced, even if the casing 51 is compact, the casing 51 is prevented from becoming expanded in the vicinities of the portions for supporting the crankshafts, i.e., in the vicinities of intermediate portions of the side plate portions 61 and 62, as has been experienced in the past. In addition, it is possible to suppress deflections which cause a widening of an interval between the lower end portions of the casing-side guide groove portions 71 and 72 which are constructed in a downwardly-oriented cantilevered manner.

In the apparatus of this embodiment, the pair of side plate portions 61 and 62, which are disposed on both sides, in the tooth width direction, of the toothed rail 40 and are guided by the guiding means 70, are coupled to each other and are reinforced at their opposite end portions and their intermediate portions by means of the pair of end plate portions 63 and 64 located on opposite sides of the swinging plates 53A to 53C as well as the coupling member 521 located between the crankshafts 54 and 55 as viewed in the longitudinal direction of the toothed rail 40. Therefore, the guiding means 70 is capable of providing stable guiding operation. In addition, since the swinging plates 53A to 53C are respectively provided with the through hole portions 531 to 533 through which the coupling member 521 of the casing 51 is passed, and the coupling member 521 of the casing 51 is detachably connected to the side plate portions 61 and 62 of the casing 51, the coupling member 521 can be disposed at a position effective for the reinforcement of the casing 51, and the operation of assembling the apparatus can be facilitated.

Furthermore, the assembling efficiency is further improved since the casing 51 is comprised of the first and second segments 511 and 512 with the plurality of crankshafts 54 and 55 placed therebetween and which constitute the side plate portions 61 and 62 and the end plate portions 63 and 64, and since the coupling member 521 couples those portions of the toothed rail 40-side second segment 512 (of the first and second segments 511 and 512) which constitute the lower portions of the side plate portions 61 and 62.

As a result, even in a case where the casing 51 is compact, the meshing state of the swinging plates 53A to 53C and the toothed rail 40 is made stable, it is possible to maintain a high degree of linear feeding accuracy, and it is possible to sufficiently respond to the requirements in recent years for compact size and lower cost.

As described above, in accordance with the present invention according to claim 1, the arrangement provided is such that the casing includes: a pair of side plate portions which extend in parallel on both sides, in the tooth width direction, of the toothed rail and are guided by the guiding means; a pair of end plate portions which are located on opposite sides, as viewed in a longitudinal direction of the toothed rail, of the swinging plates and connect opposite end portions of the pair of side plate portions; and a coupling member which is located between the plurality of crankshafts as viewed in the longitudinal direction of the toothed rail and couple intermediate portions of the pair of side plate portions. Accordingly, the pair of side plate portions can be coupled to each other and reinforced at their opposite end portions and intermediate portions by means of the pair of end plate portions located on opposite sides of the swinging plates and the coupling member located between the plurality of crankshafts. Thus, even if the casing is compact, it is possible to provide a linear motion apparatus which is capable of stabilizing the state of meshing between the swinging plates and the toothed rail, and of maintaining a high degree of linear feeding accuracy, and it is possible to sufficiently respond to the requirements in recent years for the compact size and lower cost of the apparatus.

In addition, in accordance with the present invention according to claim 2, since each of the swinging plates has a through hole portion through which the coupling member of the casing is passed through, and the coupling member is detachably connected to the side plate portions of the casing, the coupling member can be disposed at a position effective for the reinforcement of the casing, and the operation of assembling the apparatus can be facilitated.

What is claimed is:

1. A linear motion apparatus comprising:

a toothed rail having a plurality of teeth of a predetermined pitch;

a linearly driving mechanism section including a plurality of swinging plates having a plurality of teeth of a substantially identical pitch to that of the teeth of said toothed rail, a plurality of rotatable crankshafts which engage said swinging plates such that the teeth of said swinging plates swing in parallel to each other while maintaining a predetermined phase difference, and a casing for supporting said swinging plates through said crankshafts such that said swinging plates oppose said toothed rail in parallel to each other, wherein said linear driving mechanism section converts rotation of said crankshaft to relative movement of said casing and said toothed rail; and guiding means for guiding said casing on both sides, in a tooth width direction, of said toothed rail such that said casing is capable of undergoing relative movement with respect to said toothed rail, wherein said casing includes:

a pair of side plate portions which extend in parallel on both sides, in the tooth width direction, of said toothed rail and are guided by said guiding means;

a pair of end plate portions which are located on opposite sides, as viewed in a longitudinal direction of said toothed rail, of said swinging plates and connect opposite end portions of said pair of side plate portions; and a coupling member which is located between said plurality of crankshafts as viewed in the longitudinal direction of the toothed rail and is non-rotatably fixed to intermediate portions of said pair of side plate portions.

2. A linear motion apparatus according to claim 1, wherein each of said swinging plates has a through hole portion through which said coupling member of said casing is passed, and said coupling member of said casing is detachably connected to said side plate portions of said casing.

3. A linear motion apparatus according to claim 1, wherein said casing includes first and second segments which vertically oppose each other with said crankshafts placed therebetween and which are coupled to each other and constitute said side plate portions and end plate portions, and said coupling member couples those portions of said second segment which constitute the lower portions of the side plate portions.

4. A linear motion apparatus according to claim 1, wherein said guiding means includes guide grooves formed on both side surfaces, in the tooth width direction, of the toothed rail, and rolling members which are interposed between each of the side plate portions of the casing and the toothed rail and are held in the side plate portions so as to roll along the guide grooves.

* * * * *